July 6, 1943.   F. P. STULL   2,323,577
APPARATUS FOR PLASTIC MOLDING
Filed Aug. 23, 1940   2 Sheets-Sheet 1
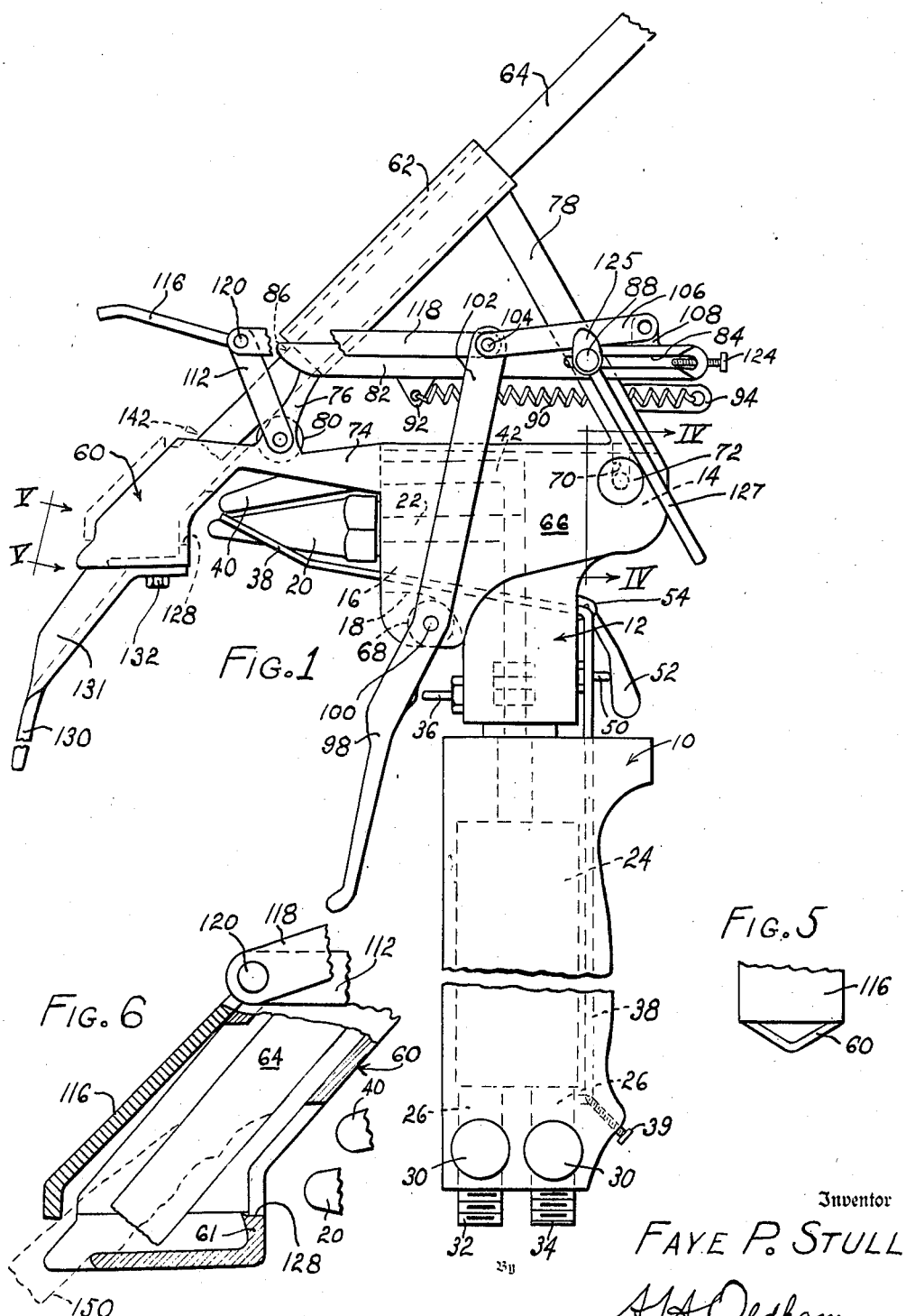
Inventor
FAYE P. STULL
AH Oldham
Attorney

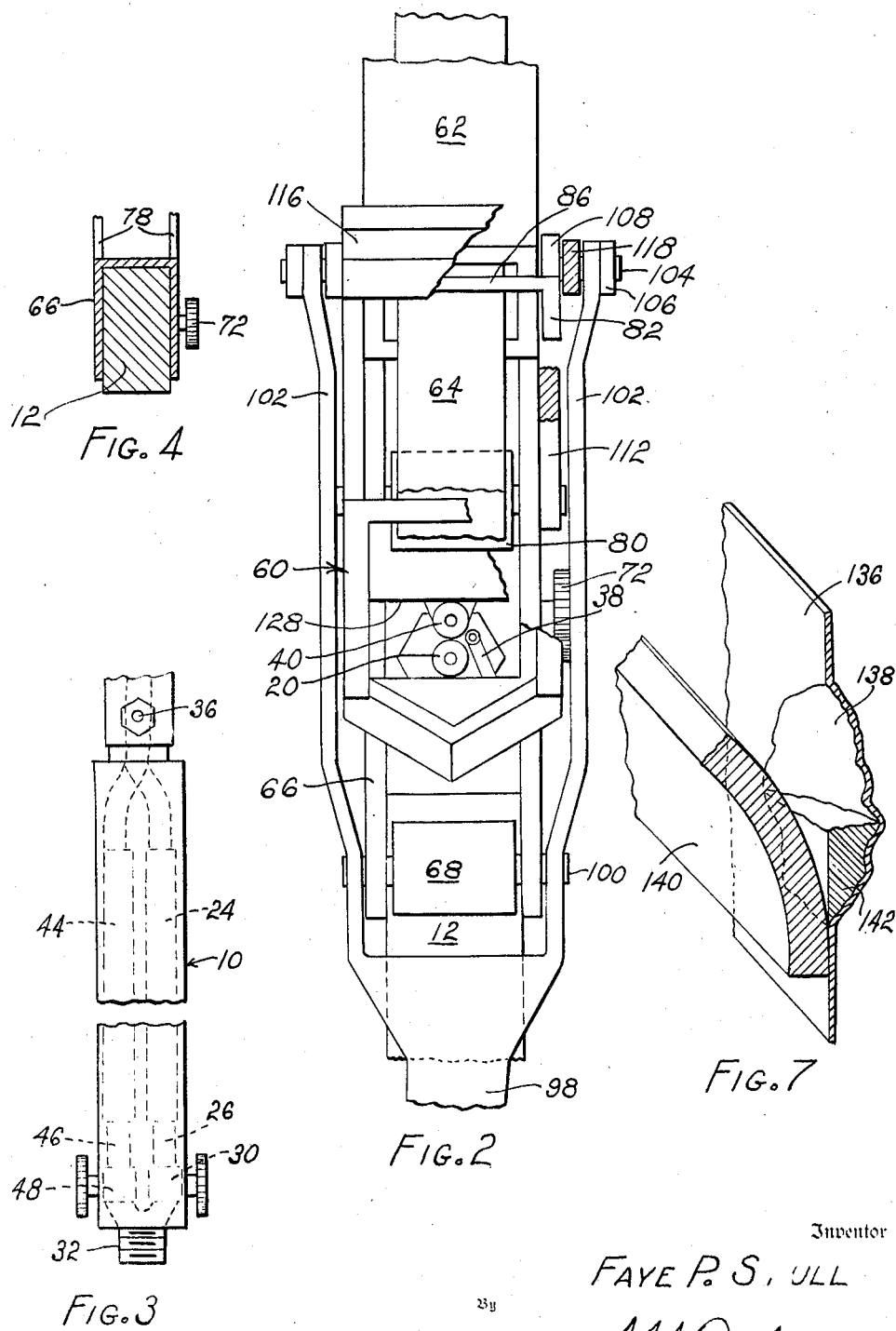

Patented July 6, 1943

2,323,577

UNITED STATES PATENT OFFICE 2,323,577

APPARATUS FOR PLASTIC MOLDING

Faye P. Stull, Youngstown, Ohio

Application August 23, 1940, Serial No. 353,852

17 Claims. (Cl. 113—109)

This invention relates to apparatus for plastic molding, and, more particularly, is concerned with means for depositing metal on a base or bases, for example, depositing solder in a dent in an automobile body or the like, or more broadly, the invention can be used to join plates, pipes or other members, and in general wherever the addition or building up of metal is desirable.

Heretofore, means have been provided on soldering irons to mechanically feed solder to the tip of the soldering iron. Also, it has been proposed to feed a low melting metal alloy to an alcohol torch or the like for facilitating a soldering operation. Further, it has been suggested to employ a soldering iron which contains a molten body of solder and to control the flow of solder from the iron by means of a valve.

I have reviewed devices and apparatus of the indicated type with the thought that they might be adapted to plastic molding operations, for example, that of depositing solder in a base or in a depression in an automobile body so as to fill the depression and thus repair the body. However, I have found that none of the devices now known or suggested is capable of performing a plastic molding operation of the character indicated. Known devices cannot sufficiently heat the automobile body to permit the deposit of solder, and, moreover, are not adapted to the deposit of large amounts of solder required in many plastic molding operations as distinguished from simple soldering operations.

Prior to my present invention it has been the standard practice in filling in dents or depressions in an automobile body, or the like, to first heat and tin the dent or depression by an oxyacetylene torch or similar means. Thereafter, the operator takes a bar of solder in one hand and while holding the torch in the other melts off a desired or necessary amount of solder and attempts to direct it into the dent or depression. If the dent or depression is on the side of an automobile body it is very difficult to get the solder to stick and a considerable portion splashes down to the floor. However, the operator after succeeding in sticking some solder in the depression drops the solder bar and picks up a paddle, and holding the paddle in one hand and the torch in the other, the operator heats the solder in the depression and attempts to smooth it over with the paddle. During this operation solder may flow out of the depression and it is again necessary to drop the paddle, pick up the solder and melt additional solder into the depression. This operation is repeated as many times as is necessary to obtain the depositing of the desired amount of solder in the depression and the smoothing off of the solder so that the body can be finished off to present a smooth surface suitable for painting.

In the standard method of plastically molding solder onto an automobile body great care must be taken when working around a window because if the torch accidentally strikes the window the glass may be cracked. As a result, it has been the usual practice to remove the window when an attempt is made to fill in a depression near it. This entails considerable extra work and adds greatly to the cost of repair.

It is the general object of my invention to avoid and overcome the foregoing and other difficulties of and objections to known methods and apparatus for plastic molding by the provision of improved means and methods characterized by low initial, maintenance, and operating costs, simplicity and rapidity in operation, and quality and permanency of result.

Another object of my invention is to provide a combined heating and metal melting apparatus adapted to be held in and controlled by a single hand and which is capable of being used to melt rapidly a desired amount of solder, or the like, or which may be instantly changed to a torch for heating the work.

Another object of my invention is the provision of a single tool adapted to be held in one hand of an operator and capable of heating the work, melting plastic onto the work and molding the plastic on the work.

Another object of my invention is the provision of a combined torch and solder melting apparatus in which solder may be melted rapidly and to a desired degree of viscosity.

Another object of my invention is to provide apparatus of the character described which includes a fire box and trigger controlled means for moving a bar of solder into and out of the fire box so that any dropping of solder from the tool when not desired is eliminated.

Another object of my invention is to provide a plastic melting tool and method in which the plastic is supported in a controlled position on a rest during the melting operation.

Another object of my invention is the provision of apparatus of the character described wherein a plurality of independently controlled heating means are provided, with the independent controls for the heating means being adapted to be operated by the single hand of the operator carrying the tool.

Another object of my invention is to provide a relatively light weight, inexpensive, easily operated and useful tool for depositing solder, or like metal, on a base or bases, for example on an automobile body.

Another object of my invention is to provide improved means for depositing metal upon a base and characterized by simplicity, low labor cost, quickness, and the absence of skilled labor requirements.

Another object of my invention is the provision of means or methods to melt solder and guide it into engagement with the work.

Another object of my invention is the provision of an improved method whereby a single operator can hold in one or two hands all of the means to completely deposit and mold a desired amount of metal on a base or bases and wherein he need never lay down any of the tools during the complete operation or pick up any other tools.

The foregoing and other objects of my invention are achieved by the provision of a method of repairing a depression or dent in an automobile body, or the like, or depositing metal on a base member or members which comprises heating and tinning the body, melting and depositing solder or other metal onto the base, and heating the deposited solder all by a single apparatus held in one hand, and molding the deposited solder by means held in the same or other hand.

Again, I provide a method of melting a bar of plastic, such as solder, which comprises positioning the bar so that one end is lower than the other, supporting the lower end of the bar on a rest, holding the bar so that it will feed down against the rest substantially by gravity as the lower end of the bar is melted, and applying heat adjacent the lower end of the bar so as to melt it.

In accordance with my invention, I provide plastic molding apparatus comprising a fire box, means for supporting a body of plastic material adjacent the fire box, trigger means adapted when pulled to move part of the plastic into the fire box and when released to move the body of plastic substantially out of the fire box, heating means associated with the fire box, said heating means being adapted without the body of plastic in the way to throw heat outwardly from the fire box to heat any objects placed adjacent thereto, and cover means and adapted to close the fire box an adjustable amount when the trigger means are pulled. I contemplate controlling the operation of the heating means by the trigger means, and I may employ a second heating means adjacent the first, with the second heating means being independently controlled.

For a better understanding of my invention reference should be had to the accompanying drawings wherein Fig. 1 is a side elevation of one form of apparatus embodying the principles of my invention; Fig. 2 is a fragmentary front elevation, partly broken away, of the apparatus shown in Fig. 1 but on an enlarged scale; Fig. 3 is a front elevation of the handle of the apparatus shown in Fig. 1; Fig. 4 is a cross-sectional view taken on line IV—IV of Fig. 1; Fig. 5 is a fragmentary view taken on line V—V of Fig. 1; Fig. 6 is a side elevation partly in section of the fire box and on an enlarged scale; and Fig. 7 is a perspective view, partly in section, of a depression in a base and the manner in which the depression is filled in accordance with my present invention.

Referring to the drawings, the numeral 10 indicates a handle, usually formed as a pistol grip, which handle carries a head, indicated as a whole by the numeral 12. The head 12 is, in the embodiment of my invention illustrated, in the nature of a block formed with a rearwardly protruding portion 14, and a curved surface 18 connecting the base of the head and a forwardly extending portion 16. A tip or nozzle 20, such as employed on a standard oxy-acetylene torch, is screwed into the head on the forwardly projecting portion 16 thereof. The tip 20 may be of any desired size but is usually about a No. 3.

The tip 20 is connected through suitable passages 22 with a mixing chamber or means 24 carried in the handle 10. As best seen in Figs. 1 and 3, the mixing chamber 24 is carried in one half of the handle and connections 26 extend through suitable valves 30 to an oxygen inlet 32 and an acetylene inlet 34. By adjusting the valves 30 the desired flow of oxygen and acetylene to the mixing chamber 24 can be controlled, and a valve 36 carried at the bottom of the head 12 controls the flow of the mixture of the oxygen and the acetylene through the passage 22 and out of the tip 20. A small by-pass tube 38 extending from the acetylene conduit 26 and into a position adjacent the end of the tip 20 acts as a pilot light for the tip 20. The flow of gas through the tube 38 is controlled by a screw 39. It should be understood that the use of the pilot light is not essential but is only preferred and is advantageous in the embodiment of my invention illustrated.

I may employ a plurality of tips similar to the tip 20 or I may use a multiple hole tip. The advantage of a multiple hole tip is that it concentrates a great deal of heat in a small area and does not throw a long flame which is also an advantage because the tool need not be moved away from work when changing from melting to work heating. The tips may be aligned vertically or horizontally or may be placed in the form of a ring and may be of any desired size. In the form of my invention shown I have illustrated a tip 40 positioned vertically adjacent the tip 20 and connected by a passageway 42 with a second mixing chamber 44 carried in the other half of the handle 10. The mixing chamber 44 is connected by conduits 46 to valves 48 which are connected in turn to the oxygen inlet 32 and the acetylene inlet 34. A valve 50 operated by a thumb lever 52 pivotally secured to the head 12, as at 54, controls the flow of the mixed oxygen and acetylene through the passage 42 to the tip 40.

Mounted on the head 12, preferably but not necessarily in the quickly removable manner hereinafter described, is a fire box, indicated generally by the numeral 60, and a tube 62 adapted to slidably receive a body of plastic, as for example a bar of solder 64. One convenient manner of mounting the aforesaid means in a quickly releasable manner on the head 12 is to provide a saddle 66 made of sheet metal and having an inverted U-shape in cross section, best seen in Fig. 4. The saddle 66 carries a spacer 68 pivotally between the downwardly extending sides of the saddle and at the bottom and forward portion thereof. The spacer 68 is adapted to engage in the radius of the curved surface 18 formed on the bottom of the front of the head 12. The head 12 is formed with a vertical slot 70 adapted to releasably receive a thumb screw 72 which extends between the side flanges of the saddle 66.

Thus, the saddle can be quickly removed by loosening the thumb screw 72 and tipping the saddle forwardly and off the head. Similarly, the saddle can be quickly placed on the head by reversing the operation.

The saddle 66 is formed with a pair of forwardly extending arms 74 which support the fire box 60. The arms 74 may be formed integral with the saddle and welded to the fire box or vice-versa or may be made separately and welded to both the saddle and the fire box. The arms 74 have integral upwardly extending portions 76 which are welded or otherwise secured to the tube 62. The other end of the tube 62 is supported by a pair of brackets 78 which are welded or otherwise secured to the saddle and to the tube, as best seen in Figs. 1 and 4. The result is that the tube 62 is supported in an angular position above the saddle and in alignment with the fire box 60 so that the bar of solder 64, or other plastic material, will slide by gravity down through the tube 62 and into the fire box 60 which is open at its upper end. A roller 80 is pivotally supported between the arms 74 and provides a rolling support for the solder bar adjacent the fire box 60.

Means are provided to move the solder bar 64 into and out of or substantially out of the fire box 60. To this end, a U-shaped member 82 having its leg portions formed with longitudinal slots 84 and having a knife edge 86 comprising the bottom of the U is provided. The longitudinal slots 84 slide on pins 88 carried in the brackets 78. The knife edge 86 is held normally in engagement with the bar of solder 64 by means of a tension spring 90 carried between brackets 92 on the U-shaped member 82 and an anchor member 94 carried on the brackets 78. Thus, the bar of solder 64 is normally held in the position shown in Fig. 1 and is prevented from downward movement due to the action of gravity.

However, means are provided to move the knife edge 86 away from the bar of solder and in the embodiment of my invention illustrated these means take the form of a trigger 98 extending down along the handle 10 and pivotally supported on the same pin 100 that pivotally supports the spacer 68. The trigger 98 includes an upwardly extending portion 102 which is pivotally secured, as at 104, to a link 106 which in turn is pivotally secured to a bracket 108 extending upwardly from the leg of the U-shaped member 82. Ordinarily, I make the trigger 98 bifurcated from a point immediately below the pin 100 upwardly. Thus, the trigger 98 has an upwardly extending leg 102 on each side of the saddle 66 and a pair of links 106 and brackets 108 are provided, all as will be understood and as will be evident from a consideration of Fig. 2. However, I contemplate making the assembly so that the trigger, linkage, knife-edge means and the like are positioned only on one side of the saddle. However, the bifurcated construction is ordinarily preferred and gives a better balanced unit.

The front of the fire box 60 is ordinarily open and I provide a quickly operable door or cover for closing the fire box to an adjustable degree. Specifically, a pair of links 112 are hinged to the ends of the pin 114 which rotatably supports the roller 80. The links 112 are connected rigidly and in cantilever with a door or cover 116. Links 118 pivotally connected to studs 120 and to the pivots 104 serve to connect the door 116 with the trigger 98 so that when the trigger is pulled the door 116 moves down to the dotted line position shown in Fig. 1. A screw 124 adjustably mounted in a laterally positioned lug on the end of the U-shaped member 82 engages with a cam 125 rotatably mounted on pin 88 to control how far the trigger 98 can be pulled and thus the degree of closing the door 116 over the front end of the fire box 60. A lever 127 secured to the cam 125 and readily reached by the thumb of the operator permits the degree of closing of the door to be changed during the operation of the tool.

The fire box 60 is formed with an opening 128 at its back side adjacent the tips 20 and 40 so that the flame from the tips is directed into the fire box. Also, the fire box is preferably formed with a V-shaped bottom, as best seen in Figs. 2 and 5, so that the bar of solder is automatically positioned or aligned centrally of the sides of the fire box.

I may mount a molding tool 130 removably on the assembly, for example, the tool 130 may be connected to the bottom of the fire box 60 by a screw 132. The tool 130 may be made in any of a variety of forms but is shown as comprising a flat plate or trowel. The V-shaped bottom of the fire box acts as a trough for guiding the fluid or plastic solder onto the base or work. However, I may employ additional trough means which extend outwardly of the fire box and these additional trough means are indicated by the numeral 131 and are shown to be a part of the molding means 130 although it should be understood that even though the means 130 are not used that the trough means 131 may be used.

In the operation of my improved apparatus, with the molding means 130 removed, oxygen and acetylene hoses are connected respectively to the conduit 32 and 34. Thereafter, the pilot tube 38 is lit and the screw 39 adjusted and it will be recognized that this tube burns acetylene and provides a small flame adjacent the tips 20 and 40. Now, the valves 30 and 43 are adjusted by means of the appropriate thumb wheels attached thereto so that the desired ratio of oxygen and acetylene will be passed to the mixing chambers 24 and 44. The mixture can be tested by operating the valve 50 and the valve 36, usually without any solder in the tool, so that a flame of the desired shape and condition will be directed from the tip 20 and the tip 40. Now a bar of solder is placed in the tube 64 and is allowed to feed down until the end strikes the knife edge 86 which is in the path of movement of the solder bar when the trigger 98 has not been pulled. In order to allow the bar of solder to attain the position shown in Fig. 1 the trigger 98 should be squeezed and then released which causes the bar of solder to move under the knife edge 86 as hereinafter more fully described.

Now with the tool ready for operation, and assuming that a plastic molding operation is to be performed, for example to repair a dent 138 on the side of an automobile body 136 (see Fig. 7), the trigger 98 is first squeezed only part way to thereby open valve 36 and allow the tip 20 to be ignited by the pilot tube. When this is done a hot oxy-acetylene flame will shoot into the fire box 60 and out the front end thereof and the flame can be directed against the surface of the dent 138 so as to bring the metal thereof up to a desired temperature and to perform a tinning operation thereon. It will be understood that the door 116 has not moved down to a position which interferes with the heating action of the flame, although the door has begun to move down. If additional heating is desired the operator may depress the thumb lever 52 to thereby ignite tip 40 and thus provide extra heat for the heating operation.

Once the metal in the body has been brought to the desired temperature and has been appropriately tinned, and with the operator still holding the tool in one hand the operator grasps a molding tool or paddle 140 in the other hand and holds it against the automobile body 136 immediately below the dent 138. Thereupon, the operator pulls the trigger 98 down until the adjustable screw 124 engages with the cam 125 and this causes the U-shaped member 82 to dip forwardly and downwardly to allow the solder bar 64 to move substantially by gravity beneath the knife edge 86 and into the fire box 60. The arrangement of the parts is such that the knife edge 86 moves away from the surface of the solder bar substantially at the point shown by the numeral 142. Thus, the end of the solder bar is directly in front of the tips 20 and 40 although it should be noted that flame from the tip or tips engage with the solder approximately three-eighths to one-half an inch upwardly from the end thereof.

The result is a very quick melting action on the solder and the arrangement of the parts is such that a melting action of any desired degree can be obtained. More particularly, with the trigger 98 pulled down until the screw 124 strikes the cam 125, the knife edge 86 has moved away from the solder bar 64 in the region 142 so that the solder bar is free to move down by gravity until its lower end strikes against the rest provided by the bottom of the fire box 60. Inasmuch as the bottom of the fire box is V-shaped the bar 64 aligns itself laterally by always tending to move to the center and bottom of the V. Also the door 116 and the bottom of the fire box form a V so that the bar is aligned and centered in the other direction.

An important part of my invention is the provision of a controlled and adjustable support or rest for the lower end of the solder bar. In other words, if the rest supports and extends over the entire end of the solder bar then the entire end of the solder bar must melt and flow off freely to allow the solder bar to feed down by gravity. However, if the rest extends only partly over the end of the solder bar, as shown in Fig. 6, the front portion of the bar of solder need only soften to a semi-plastic state and the back portion of the bar melt to allow the solder bar to feed downwardly by gravity. I may arrange to move the rest provided by the bottom of the fire box 60 adjustably in and out or to control the support for the solder bar.

However, I accomplish substantially the same end by varying the degree that the solder bar may move around a stationary rest. This in effect is an adjustment of the position of the rest. Specifically, by controlling the degree of closing of the door 116 by varying the lever 127 and cam 125 or by adjusting the screw 124 I provide a larger or smaller opening to the front of the rest provided by the bottom of the fire box 60. Thus, when the opening is relatively small the solder melted is quite hot and fluid and tends to come out as a flow of drops, and this is particularly true when the tip 40 is actuated in addition to the tip 20. Further, with the door 116 closed tightly more heat is retained in the fire box 60.

On the other hand, when the door 116 is open part way the solder bar 64 can more easily move around the rest and is extruded in a semi-plastic, somewhat cooler state which is similar to the extrusion of tooth-paste from a tube. The opening of the fire box door also allows more heat to escape. Throwing on the extra tip 40 merely increases the flow of semi-plastic solder rather than changing its character. I have shown in dotted lines 150 a typical position that the lower end of the solder bar assumes when the door 116 is opened part way. It will be understood that the more fluid solder in the back of the bar 64 sticks to and carries with the semi-plastic front of the bar.

In the manner heretofore described, I am able to provide large quantites of semi-plastic solder very quickly or I can provide smaller amounts of very hot and fluid solder or any type of melt between the extremes mentioned, particularly in view of the separate control for the several tips. When the solder is melted to only the semi-plastic state and is extruded in large amounts it will be understood that large pieces break off periodically, and that, moreover, the flow of solder may be stopped at any time as hereinafter described.

The melting of the solder, as last described, can be continued as long as the trigger 98 is pulled. This is because the bar of solder 64 feeds downwardly by gravity in a continuous manner as will be understood. Thus, the operator can apply as much solder, shown by numeral 142 in Fig. 6, into the dent 138 as he desires. It will be be seen that the solder is guided and molded by the paddle 140 all without losing or dropping any solder. It will be noted that the heat and flame from the tips 20 and 40 strikes the bar of solder is reflected downwardly and back and upwardly because of the shape of the back 61 of the fire box. Any time that the operator wishes he may release the trigger 98 and employ the paddle 140 to smooth the solder already applied to the dent. Also, by releasing the trigger only part way the flame from the tip 20 or tips 20 and 40 will shoot out through the fire box and can be used to heat up any solder already applied in the dent 138. It will be understood that the solder bar 64 is automatically moved back out of this fire box at any time the trigger 98 is released. This is because the initial releasing movement of the trigger 98 brings the knife edge 86 into engagement with the upper surface of the solder bar at the point 142, and under the influence of the spring 90 the continued release of the trigger causes the solder bar to move back into the position shown in Fig. 1. If the solder tends to catch on the edge of the bottom of the fire box and the trigger cannot be fully released then with the heat of the flames and the upward pull of the spring 90 the bar of solder quickly melts through and the bar moves up and out of the fire box as described. Thus, dripping of solder after the operator desires to shut off the flow of solder is substantially prevented since the bar of solder moves out of the heating zone.

Accordingly, with my improved apparatus and in accordance with my new and useful method, the operator may continuously hold my tool in one hand and a molding tool in the other hand and can use the tool to heat the base or to apply any amount of solder thereto with the heating or solder applying operations being performed intermittently or successively with any desired number of molding operations. My improved tool can be used with a high degree of success in automobile body work and particularly work around windows inasmuch as the closed fire box and the automatic shut-off of the flames upon release of the trigger largely prevent any accidental breakage of the window.

In certain operations the separate paddle 140 may even be dispensed with and the molding of the plastic solder done with the molding means 130 mounted on the tool. Of course, molding means of any desired surface configuration may be substituted for the molding means 130 as will be understood, or I may not use any molding means on the apparatus.

From the foregoing it will be recognized that the objects of my invention have been achieved by the provision of improved means and methods for expediting plastic molding operations. My tool is held continuously in one hand and can be instantaneously changed from a heating tool to an automatic solder-applying tool or to a molding tool. My apparatus and method simplify the technic, greatly reduce the cost, and improve the construction and appearance of plastic molding work, and, specifically, automobile body work particularly where the dent is to be repaired is a vertically positioned sheet metal member. Of course, I may use the tool of my invention to apply a wide variety of plastics to substantially any base member or members, and in addition to auto body work I can joint plates, pipes and other members together or can build up a deposit of plastic thereon. Plastic bars of a wide variety of sizes and cross sectional shapes may be used in my apparatus and reloading with a new plastic bar is a simple operation. Also, I am not to be limited to the use of oxy-acetylene heating means because obviously I can use other types and forms of heating means.

It will be recognized that many of the advantages of my invention may be retained although certain of the features thereof may be eliminated. As examples of only a few of the changes I contemplate, I may eliminate the tip 40 and all associated parts therefor. Again, I may eliminate the pilot tube 38 and the valve 39 so that when the trigger is fully released the tip 29 will continue to burn. Thus, while in accordance with the patent statutes I have specifically illustrated and described one embodiment of my invention and it should be understood that I am not to be limited thereto or thereby but that the scope of my invention is defined in the appended claims.

I claim:

1. In combination, means for slidably supporting a bar of plastic with one end extending downwardly and so that the bar will slide down through the supporting means substantially by gravity, a rest against which the lower end of the bar strikes to prevent it from moving out of the supporting means, means for heating the plastic adjacent the rest, and means controlling the amount of support given the bar by the rest.

2. In combination, means for slidably supporting a bar of plastic with one end extending downwardly and so that the bar will slide down through the supporting means substantially by gravity, a rest against which the lower end of the bar strikes to prevent it from moving out of the supporting means, means for heating the plastic adjacent the rest, and means controlling the degree to which the plastic bar may bend and slide around the rest.

3. Apparatus comprising a fire box, means for supporting a body of plastic material adjacent the fire box, trigger means adapted when pulled to move part of the body of plastic into the fire box and when released to move the body of plastic substantially out of the fire box, heating means associated with the fire box, said heating means being adapted without the body of plastic in the way to throw heat outwardly from the interior of the fire box to heat any object placed adjacent thereto, and cover means for the fire box connected to the trigger means and adapted substantially to close the fire box when the trigger means are completely pulled.

4. Apparatus of the type described comprising a heating means adapted to direct heat outwardly to heat an object, means for supporting a body of solder or the like, means for moving the body to and from a position between the heating means and the object to cut off the flow of heat to the object, shielding means adjustably surrounding the body to control the flow of heat around the body and the type of melting of the body, a second heating means associated with the first, and means for independently controlling the operation of the second heating means.

5. Apparatus of the type described comprising a heating means adapted to direct heat outwardly to heat an object, means for supporting a body of solder or the like, means for moving the body to and from a position between the heating means and the object to cut off the flow of heat to the object, a fire box partially enclosing the body adjacent the heating means, and means adjustably closing the fire box to control the flow of heat around the body and the type of melting of the body.

6. In combination, an oxy-acetylene torch, a fire box mounted in front of the torch and having suitable openings therein for the torch to blow directly through the fire box and heat an object placed in front of the fire box, means slidably supporting a bar of solder for gravity feed into the fire box, trigger means adapted when pulled to allow the solder to feed by gravity into the fire box and into a position in front of the torch and when released to raise the solder bar substantially out of the fire box, a front for the fire box and adapted to be moved into a position to cover the front of the fire box when the trigger means are pulled, means for adjustably controlling the degree to which the front of the fire box can be closed, means associated with the trigger means for controlling the supply of oxygen and acetylene to the torch, a pilot light for the torch, and a second oxy-acetylene torch adjacent the first, and independent means controlling the operation of the second torch.

7. A portable hand held apparatus adapted to apply plastic to a base, comprising a gas torch, means on the torch for supporting and guiding a body of plastic into melting proximity with the flame from the torch, means operable by the hand holding the apparatus for controlling the movement of the body of plastic into and out of melting relation with the flame, means adapted to surround the flame and plastic during the melting operation so that the flame cannot strike the base, and means for moving the surrounding means out of the way when the body of plastic is retracted from the flame so that the flame will be exposed to permit heating the base.

8. In combination, a gas torch, a fire box mounted in front of the torch and having suitable openings therein for the torch to blow directly through the fire box and heat an object placed in front of the fire box, means slidably supporting a bar of solder for gravity feed into the fire box, trigger means adapted when pulled to allow the solder to feed by gravity into the fire box and into a position in front of the torch and when released to raise the solder bar substantially out of the fire box, a front for the fire box, and means connecting the front and the trigger means so that the front is moved into a position to cover the front of the fire box when the trigger means are pulled.

9. In combination, a gas torch, a fire box mounted in front of the torch and having suitable openings therein for the torch to blow directly through the fire box and heat an object placed in front of the fire box, means slidably supporting a bar of solder for gravity feed into the fire box, trigger means adapted when pulled to allow the solder to feed by gravity into the fire box and into a position in front of the torch and when released to raise the solder bar substantially out of the fire box, a front for the fire box, means connecting the front and the trigger means so that the front is moved into a position to cover the front of the fire box when the trigger means are pulled, and means for adjustably controlling the degree to which the front of the fire box can be closed.

10. In combination in a portable tool, means for slidably supporting a bar of solder or the like for downward movement due to the action of gravity, means defining an opening of a size too small to allow the bar to pass therethrough and against which the lower end of the bar rests, and means for heating the bar of solder adjacent and in advance of the opening so that the bar as it melts will flow through the opening.

11. A portable hand tool including a rest carried by the tool, means on the tool for slidably supporting a bar of solder or the like so that the lower end of the bar will engage with the rest and will feed down by gravity against the rest, an oxy-acetylene torch on the tool adjacent the rest for directing a flame against the bar to melt it just above the rest, and means on the tool gripping and moving the bar off the rest and out of the oxy-acetylene flame so that the flame will shoot outwardly over the top of the rest.

12. A portable hand tool including means defining an opening, means slidably supporting a bar of solder or the like so that one end is higher than the other and the lower end is held by gravity against the means defining the opening, said bar being of a size so that it will not while solid pass through the opening, means for heating the bar adjacent the opening to melt the bar and flow it through the opening, and means for moving the means defining the opening to control the size of the opening.

13. A portable hand held tool for melting plastic comprising means for supporting a bar of plastic for sliding movement substantially on its axis, a V-shaped trough on the tool on which the lower end of the bar rests with the sides of the V aligning the bar laterally, means for throwing a flame along the trough to heat and melt the bar adjacent the trough, and closure means adjustably controlling the flow of the melted bar along the trough.

14. A portable tool for melting plastic comprising means for supporting a bar of plastic for sliding movement substantially on its axis, a V-shaped trough carried by the tool on which the lower end of the bar rests with the sides of the V aligning the bar laterally, and means for throwing a flame along the trough to heat and melt the bar adjacent the trough.

15. In combination, means for slidably supporting a bar of plastic with one end extending downwardly and so that the bar will slide down through the supporting means substantially by gravity, a rest against which the lower end of the bar strikes to prevent it from moving out of the supporting means, means for heating the bar adjacent the rest, and means controlling the degree to which the lower end of the bar may move off of the rest and pass around the edge of the rest.

16. In combination, means for slidably supporting a bar of plastic with one end extending downwardly and so that the bar will slide down through the supporting means substantially by gravity, a rest against which the lower end of the bar strikes to prevent it from moving out of the supporting means, means for heating the bar adjacent the rest, and means adjusting the amount of support given the bar by the rest to control the speed of movement of the bar through the heating zone and thus the plasticity and temperature of the melted plastic.

17. In combination in a portable tool, a gas torch, means for controlling the movement of a length of plastic to and from a position in heating relation with the flame from the torch, fire box means for surrounding the flame when the plastic is in heating position, a door on the fire box means, and means connecting the door on the fire box means and the controlling means so that when the plastic is moved away from heating position the door on the fire box means is opened to allow the flame to blow out of the fire box means.

FAYE P. STULL.